United States Patent [19]

Cox et al.

[11] Patent Number: 4,684,219

[45] Date of Patent: Aug. 4, 1987

[54] DISPLAY CELL WITH SELF-SEALING, COLLAPSING PLUG

[75] Inventors: Allen R. Cox; Anthony C. Lowe; John C. Wood, all of Hampshire, United Kingdom

[73] Assignee: International Business Machines Corporation, Armonk, N.Y.

[21] Appl. No.: 812,209

[22] Filed: Dec. 23, 1985

[30] Foreign Application Priority Data

Feb. 1, 1985 [EP] European Pat. Off. ........ 85300016.4

[51] Int. Cl.$^4$ .......................... G02F 1/133; G02F 1/25
[52] U.S. Cl. ..................... 350/343; 350/357
[58] Field of Search ........... 350/343, 391, 357

[56] References Cited

U.S. PATENT DOCUMENTS

| | | | |
|---|---|---|---|
| 3,744,126 | 7/1973 | Forlini et al. | 350/391 X |
| 3,866,313 | 2/1975 | Yih | 350/343 X |
| 3,960,534 | 6/1976 | Oates | 350/343 X |
| 4,135,789 | 1/1979 | Hall | 350/343 |
| 4,188,095 | 2/1980 | Nishimura et al. | 350/357 |
| 4,199,228 | 4/1980 | Destannes et al. | 350/343 |
| 4,226,509 | 10/1980 | Jacobs | 350/357 |
| 4,239,350 | 12/1980 | Morita et al. | 350/357 |
| 4,545,650 | 10/1985 | Kirkman et al. | 350/357 |

FOREIGN PATENT DOCUMENTS

| | | |
|---|---|---|
| 0008688 | 4/1981 | France . |
| 0138723 | 10/1980 | Japan . |
| 0138722 | 10/1980 | Japan . |
| 0091220 | 7/1981 | Japan ................................. 350/357 |
| 1531475 | 11/1978 | United Kingdom . |
| 2046935 | 11/1980 | United Kingdom . |

*Primary Examiner*—John K. Corbin
*Assistant Examiner*—David Lewis
*Attorney, Agent, or Firm*—Alexander Tognino

[57] ABSTRACT

An electro-optic display cell and method of making the same is disclosed herein. The display cell has an arrangement of display electrodes in contact with a liquid within a sealed enclosure. The enclosure comprises an impervious transparent cover and a rigid structural wall member. A seal between the cover and wall member and an elastomeric plug extending between the exterior and interior complete the enclosure. The cell is filled by injecting the liquid into the presealed enclosure by perforating the plug with hollow needles also employed to remove entrapped gas. Upon withdrawal of the needles the perforations collapse to self-seal the enclosure but for added integrity the plug is also mechanically clamped. The seal and plug can be formed as an integral elastomeric moulding around a frame member forming the side wall of the enclosure and the frame member clamped between the cover and a separate base.

15 Claims, 7 Drawing Figures

DISPLAY CELL WITH SELF-SEALING, COLLAPSING PLUG

BACKGROUND OF THE INVENTION

1. Field of the Invention

The invention relates to electro-optic display cells of the kind having an arrangement of display electrodes in contact with a liquid within a sealed enclosure and to methods of making such cells.

2. Description of Related Art

Electro-optic cells of the above kind generally employ either liquid crystal or electrochromic materials to produce a display effect. In both cases purity of the solution is vital to proper functioning of the display over its operational lifetime. Impurities can react chemically with components of the solution or interfere electrochemically with the operation of the cell.

Control of impurities requires not only that the initial components of the solution are pure but also that the cell receptacle be absolutely clean prior to assembly and hermetically sealed after being filled with solution. Processes of filling and of subsequently sealing the cell may expose the solution to contamination by, for example, sealing or atmospheric components. Another disadvantage of many sealing processes is that heat employed for curing, reflow of glass frit of soldering may also result in thermal decomposition of components or other heat damage. Exposure to the surrounding atmosphere during the filling process may also result in gas dissolving in the solution and later causing bubbles to form within the cell.

Very many alternative methods of filling and sealing display cells have been described in the prior art. By way of example, UK pat. No. 1,531,479 shows a filler hole in a steel backplate of an electrochromic cell. After filling, the hole is sealed by means of an overlying plate adhesively bonded to the backplate over and around the filler hole. U.S. Pat. No. 4,135,789 show a filler hole in the glass faceplate of a liquid crystal cell which is sealed by means of a capped glass plug fused in place with melted glass frit. U.S. Pat. No. 4,239,350 shows a combination of a glass plug and a plate bonded in place with epoxy resin. French published patent application No. 2,505,069 shows a combination of polythene and metal disks begin resin bonded over a filler hole in the glass cover plate of a liquid filled display.

Alternatively, cells can be filled via their side wall as in U.S. Pat. No. 4,199,228 which shows an electrochromic cell which is filled by means of a glass filler tube in a narrow glass side wall. The filler tube is sealed off by melting its outer end. U.S. Pat. No. 4,188,095 shows a display cell in which a filling port in a side wall formed of epoxy resin is subsequently sealed with solder.

Besides the sealing materials so far mentioned, it is also known to use resin material directly to seal a filling hole. In published patent application GB No. 2,046,935A the side wall of an electrochromic cell is formed by a double epoxy resin spacer and sealant the inner portion of which is cured by reaction with the electrolyte. The same resin sealant is used to seal a filling hole. In Japanese published patent application No. 55-138723A, an electrochromic cell is formed by a resin coated metal back plate and a glass cover. The plate is provided with a hole through which fluid is injected into the cell. The edges of the hole are also lined with resin and, after filling, the hole is sealed by melting the resin around it and applying further resin.

It is also known to provide a display cell with an elastomeric closure whose action is purely mechanical. U.S. Pat. No. 4,226,509 shows a liquid containing display of sandwich construction in which two filling holes are provided, one in each faceplate. A common elastomeric plug is drawn through both these holes to seal them. An alternative arrangement with a single filling hole is also described in which a sealing plug is drawn through a channel shaped brace on the exterior of the faceplate so as to cover the filling hole.

Another electrochromic display employing an elastomeric closure is described in U.S. Pat. No. 4,545,650. In this case an elastomeric diaphragm is placed over the filling hole when the cell is full and clamped in place in a manner which leaves it free to flex to accommodate expansion.

SUMMARY OF THE INVENTION

Although, in the prior art exemplified above, precautions are taken to minimize the contamination of the cell solution by sealing the cell, the processes involved often expose the solution to sealing substances or heating cycles which may be deleterious. Even in those cases where a purely mechanical inert closure is employed, there is always a period when the solution is open to the surrounding atmosphere, at least in the filling orifice. Any gas which dissolves in the solution at this point can cause not only chemical problems such as oxidation but enable the later formation of bubbles which could interfere with the operation or appearance of the display.

To avoid such problems, the present invention provides a method of making an electro-optic display cell of the kind having an arrangement of display electrodes in contact with a liquid within a sealed enclosure, comprising the steps of:

forming a pre-sealed enclosure from an impervious cover means comprising a transparent window, a rigid structural member forming part of the enclosure wall, a seal between the cover means and the structural member and an elastomeric plug extending between the exterior and interior of the enclosure;

filling the cell by perforating the plug with hollow needle means, removing entrapped gas from the enclosure and introducing said liquid into the enclosure by way of the needle means; and resealing the enclosure by effecting withdrawal of the needle means and collapsing or allowing to collapse the perforation or perforations formed by the needle means over at least a portion of their length.

By resealing the cell container in this way with elastomeric material, the cell can be evacuated and filled through needles without exposure of the solution to atmosphere. Although, in general, perforations through the plug will collapse and form an adequate self-sealed closure, it is preferred that the plug should be mechanically clamped upon withdrawal of the needle means to ensure collapse of such perforations.

The needle means preferably comprises two distinct needles, a riser needle for removal of entrapped gas and a filler needle for introduction of said liquid. The riser needle may then be withdrawn after liquid is introduced but prior to removal of the filler needle. The mechanical clamping then takes place in two stages, firstly, across the riser needle perforation after its withdrawal and, secondly, across the filler needle perforation after its subsequent withdrawal. Of course, alternative needle structures such as two concentric tubes can be envisaged but the resulting perforation would be larger and more difficult to close. In the preferred two needle method, pressure can be maintained to the filler needle and the plug clamped across the needle perforations before the needles are fully withdrawn. Of course, withdrawal of a needle can be effected either by moving the needle itself or by moving the enclosure away from a stationary needle.

Of course, to be of practical value the enclosure components must be scrupulously clean to start with and preferably the evacuation of the enclosure is followed by purging with an inert gas and re-evacuation before filling commences. Alternatively, assembly of the cell can be carried out in an inert atmosphere and the gas in the cell simply evacuated before filling. The preferred orientation of the cell during preparation and filling is with the plug at the uppermost point of the enclosure so that gas can readily escape and no bubbles are trapped.

An electro-optic display cell according to the invention comprises an arrangement of display electrodes in contact with a liquid within a sealed enclosure, the enclosure comprising impervious cover means comprising a transparent window, a rigid structural member forming part of the enclosure wall, a seal between the cover means and the structural member and an elastomeric plug extending between the exterior and interior of the enclosure, the plug having at least one filling perforation therethrough which is collapsed over at least a portion of its length so that the enclosure is completely sealed.

In the preferred form of display cell, the structural member is a frame forming the side wall of the enclosure and through which the plug passes, the enclosure further comprising a base structure for supporting the display electrodes and a further seal between the base structure and the frame, the two seals being compression seals and the cell including clamping means for clamping the cover means, frame and base structure together.

Of course alternative cell structures are possible in which the plug may be located in a portion of the cover or else in the base structure which may also be integral with the side wall.

Although it is possible for the plug to be a separate member, it is preferable that the seals and plug are an integral moulding of the elastomeric material around the frame member. The material can conveniently extend over at least the inner surfaces of the frame in contact with the liquid to facilitate the use of metal frames which might otherwise react with the liquid.

Preferably, the frame defines an apex for the enclosure at which the plug is located. This assists the escape of gas when the cell is oriented for filling as mentioned above.

As has already been mentioned, it is preferable that the plug portion be mechanically clamped to ensure collapse of the perforations. In the preferred cell structure in which the plug has two perforations caused by the riser and filler needles, the clamping is achieved by means of two screws mounted in the base structure, each of which compresses the plug to ensure collapse of a respective perforation.

The integral elastomeric moulding, as well as providing a means of sealing and filling the cell, can also be employed to accommodate expansion of the liquid in the cell. By providing the frame with a cross bar of lower height than the side wall portions of the frame so that the area within the frame is divided into a display electrode area and an expansion area, the elastomeric moulding can be extended across the expansion area to form a diaphragm which can flex to accommodate expansion or contraction.

Another advantage of the integral moulding is seen in the case of a display cell having a semiconductor chip on which the display electrodes are formed and a separate support body for the chip. The seal between the base structure and frame is preferably arranged to seal the frame against the chip to confine the liquid to the surface of the chip. This has the advantage of enabling the area of the chip to be kept to a minimum while minimizing the risk of damage to the chip as compared with e.g. an O-ring type of seal.

This latter aspect is inventive in its own right, independently of the filling method employed, and broadly provides an electro-optic display cell comprising a solution and an array of display electrodes formed on a semiconductor chip, the chip containing integrated circuitry for operating the electrodes to display an image, the cell further comprising a rigid support body for the semiconductor chip, a cover plate comprising a transparent window, a metal frame structure for framing the display electrode array, an inert elastomeric coating on at least the inner sides and top and bottom faces of the frame, a clamping means for clamping the frame, cover plate and support body together to form an enclosure for the solution so that the coating on the bottom face of the frame seals against the semiconductor chip to confine the conductive solution to the top surface thereof.

One further aspect of the expansion arrangement, too, is inventive in its own right, independently of the filling method and, at its broadest, provides a liquid-filled electro-optic display cell having an arrangement of display electrodes for displaying an image and a sealed enclosure for enclosing the display electrodes under liquid, the enclosure having a rigid wall structure with at least one aperture therein, an elastomeric diaphragm sealing the aperture and being capable of flexing to accommodate expansion or contraction of the liquid, and an impervious gas-filled chamber enclosing the diaphragm externally, and being sealed to the wall structure. In the preferred cell structure, this can be achieved by providing a blind hole in the base structure opposite the expansion diaphragm and providing the elastomeric moulding with an additional sealing surface around the expansion diaphragm which seals against the base structure around the blind hole to form such a chamber.

The invention will now be described, by way of example only with reference to a preferred embodiment thereof as illustrated in the accompanying drawings.

DETAILED DESCRIPTION

Figures 1, 2:
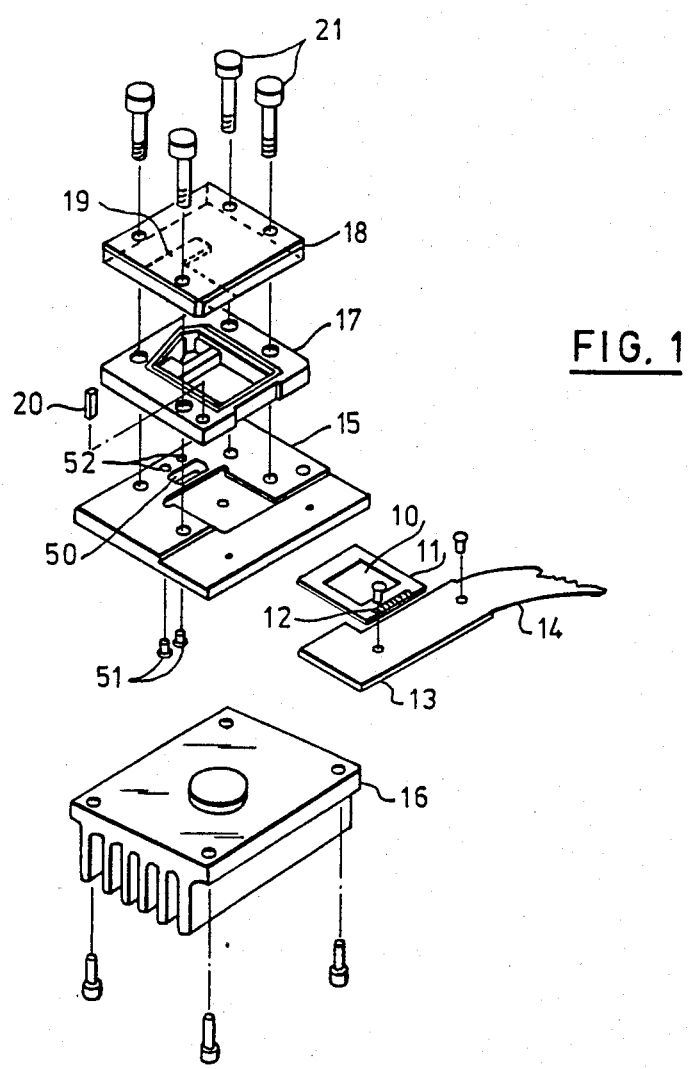
FIG. 1 shows an exploded isometric view of an electro-optic display cell according to the present invention.
FIG. 2 shows the cell of FIG. 1 in its assembled state.

An electro-optic cell according to the invention is illustrated in both exploded and assembled form in FIGS. 1 and 2. The illustrated cell is of the electrochromic type employing viologen in aqueous solution as the electrochromic material. The viologen is a mixture of 1, 1'di-heptyl 4, 4'bipyridinium phosphate and hypophosphite. The composition of the solution, which also includes ions having a catalytic effect, is described in U.S. Pat. No. 4,488,782.

At the heart of the display cell is a rectangular matrix 10 of individually addressable silver display electrodes (not separately illustrated in FIG. 1) formed on the upper surface of a silicon chip 11. Each of the electrodes in the matrix is connected to one of an underlying matrix of field-effect transistors, formed in the chip 11 by integrated circuit techniques. The electrode/transistor matrix is made by thin film fabrication techniques. The upper surface of the entire chip 11 between and around the silver electrodes is passivated by a double layer of polyimide except for a number of pads 12 on the edge of the chip. These pads provide the external electrical connection to a rigid circuit board portion 13 of an otherwise flexible tape cable 14 by means of bridging connectors (not shown).

The chip 10 and rigid cable portion 13 are supported by an aluminum body 15 which is relieved to locate both these components precisely. A heat sink and heater assembly 16 is bolted to the rear of body 15 and controls the operating temperature of the display.

The side wall of the display cell is formed by an elastomer coated metal frame structure 17 which provides the seals, filling arrangement and expansion arrangement for the display, as will be described below. The final major component of the cell is a glass cover plate 18 on which is deposited counter electrode 19. The counter electrode comprises a platinum black dispersion in an acrylic binder deposited on a titanium/gold layer. This conductive layer extends back to the edge of the cover plate where it contacts a compressible conductor 20 of the type having metal laminations on the surface of a silicone resin block. The conductor 20 passes through a hole in frame structure 17 and is compressed into contact with one of the conductors on rigid cable portion 13 by the cover plate 18.

Four large screws 21 clamp the cover plate 18 to the body 15 to compress between them not only the conductor 20 but also the elastomer coated frame structure 17. The electrochromic solution is hermetically sealed within the enclosed volume formed by the cover 18 the inner walls of frame structure 17 and the chip 11.

Having described the basic construction of the cell, the frame structure 17 will now be described in more detail with reference to FIGS. 3 to 5. As can be seen from those FIGURES, the rigid part of the frame structure 17 is a metal subframe 30 of basically rectangular shape. The subframe is coated over substantially its entire surface with an inert fluorocarbon elastomeric resin 31 by means of transfer moulding process. The only portions not so coated are the bores 32 for receiving the clamping bolts 21.

The frame structure 17 is open in the center to define a shallow chamber for holding the electrochromic solution. A cross bar 33 of reduced height divides the chamber into a main display chamber 34 and an expansion and filling chamber 35. The main display chamber 34 is open at the bottom to frame the display electrode matrix 10. The chamber 35 which lies beneath the active limb of counter electrode 19, is closed at the bottom by an expansion diaphragm 36.

At an apex 37 of chamber 35, the subframe is partially cut away and the remaining wall thickness is made up by a plug 38 of the elastomeric material. It is by perforation of this plug that the cell is filled as will be explained in more detail in connection with FIG. 6.

Figure 3:
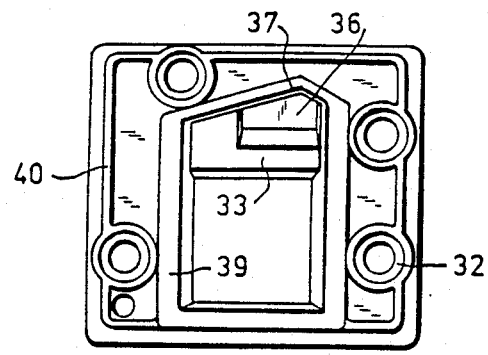
FIG. 3 shows a top plan view of an elastomer coated frame forming the sidewall of the display cell of FIGS. 1 and 2.
Figure 4:
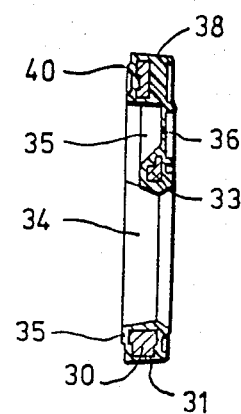
FIG. 4 shows a side sectional view taken on the dashed line shown through FIG. 3.

As best shown in the top view of FIG. 3, and the sectional view of FIG. 4, the elastomer coating 31 is moulded to provide ridge type seals 39 and 40 for sealing against cover plate 18. A broad inner seal 39 surrounds the chambers 34 and 35 and an additional secondary seal 40 extends around the periphery of the frame and the bolt holes 32.

Figure 5:
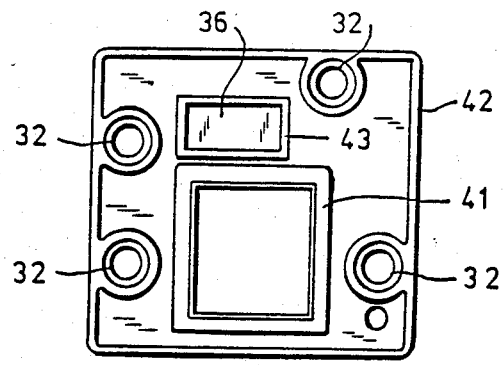
FIG. 5 shows a bottom plan view of the frame of FIGS. 3 and 4.

On the reverse side of the frame 17 as shown in FIG. 5, a broad ridge seal 41 surrounds the display aperture and seals against the silicon chip 11. Again, a finer secondary ridge seal 42 extends around the very edge of the frame 17 and bolt holes 32. Finally, a further secondary seal 43 surrounds the expansion diaphragm 36. These secondary seals 42 and 43 seal against the cell support body 15 and rigid cable portion 13.

The expansion diaphragm 36 is positioned opposite a blind hole 50 in the support body which the seal 43 surrounds. Permeation of vapor through the relatively thin diaphragm 36 will be contained by the seal 43 and the hole 50. A build up of vapor in the vapor trap will eventually prevent further ingress.

Figure 6:
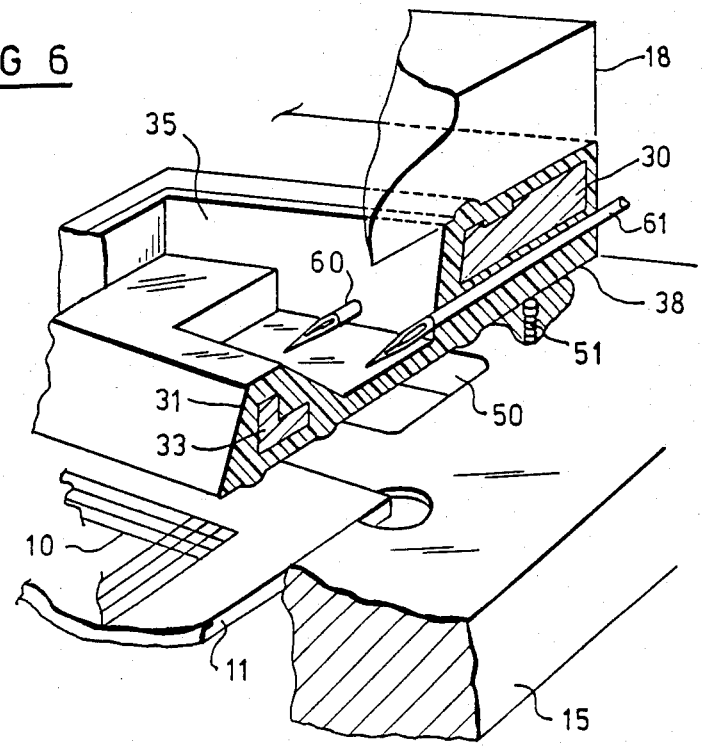
FIG. 6 is a cut-away perspective view of a portion of the cell of FIGS. 1 and 2 illustrating method of filling the cell according to the invention.

The method of assembling and filling the display cell will now be described with particular reference to FIGS. 6 and 7.

Before assembly of the cell, all of the components illustrated in FIGS. 1 to 5 are thoroughly cleaned with suitable solvents, and, if appropriate, pressure rinsed in de-ionized water and blown dry with nitrogen. In the case of the silicon chip itself, acid rinsing, photoresist removal and sputter etching are also employed.

The components are then assembled in the following sequence in a clean room (Class 100). The body 15 is positioned in a suitable fixture and the tape cable rigid portion 13 is screwed into place. Next, the chip 11 is placed into the complementary recess on body 15 and biased against the locating edge. The frame structure 17 is placed over the chip and the counter electrode connector 20 inserted into the hole in one corner of the frame. The cover plate 18 bearing the deposited counter electrode 19 is then placed on top of the frame structure. Finally, the four screws 21 are inserted into the aligned clamping holes of the cover plate, frame structure and body and the tightened simultaneously to a pre-determined torque.

At this stage, the pre-sealed cell enclosure is complete and can be removed from the clean room. Before filling commences the assembly is inverted and two small bind-head clamping screws 51 are started into threaded holes 52 in the body 15.

Figure 7:
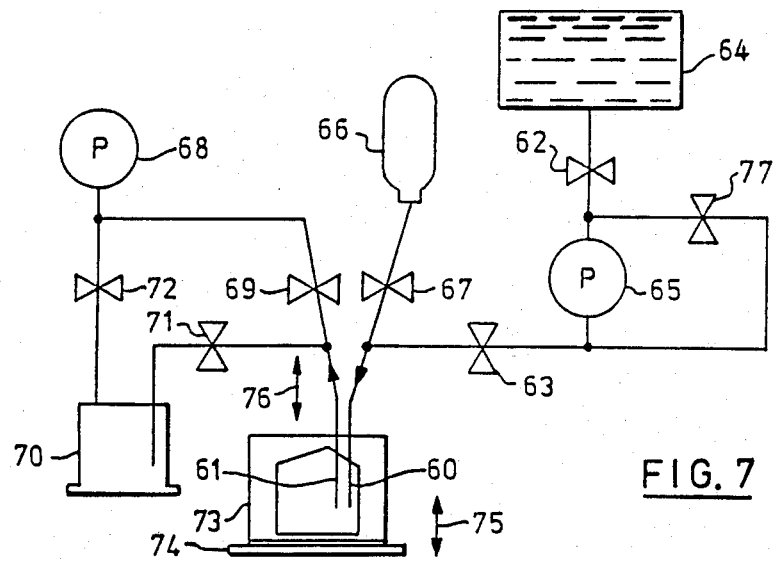
FIG. 7 is a schematic illustration of a filling rig employed to fill the cell.

The cell is then vertically oriented in a purpose-built filling schematically illustrated in FIG. 7, with the apex 37 uppermost. It should be noted that, for ease of illustration, the cell is shown horizontal in FIG. 6. In the filling fig are two hypodermic needles 60 and 61. Needle 60 is the filling needle and is selectively connectible by means of filling valves 62 and 63 to an electolyte reservoir 64 from which electrolyte under pressure may be pumped by a pump 65 to a source 66 of argon or other inert gas under pressure by means of valve 67. Needle 61 is the riser and evacuation needle and is connectible to a vacuum pump 68 either directly by way of valve 69 or by way of sealed overflow tank 70 through valves 71 and 71. Before contact with the cell the filling needle 60 is purged with argon to remove any residues from the previous operation.

Both needles 60 and 61 are positioned opposite the elastomer plug 38 which extends from the cell exterior to the filling chamber 35. The needles are set at a slight angle apart. The cell enclosure schematically illustrated at 73 is mounted on a support 74 movable vertically in the direction of arrow 75. The filler needle 60 is stationary and the enclosure is driven onto it in a controlled manner unitl it pierces plug 38 beneath the cut away portion of subframe 30 and penetrates chamber 35. The riser needle 61 is then moved independently, as indicated by arrow 76 to pierce the plug 38 and just penetrate the chamber 35 exactly at the apex 37.

In the quiescent state, the pump 65 is continually running but only a bypass valve 77 is open to allow liquid to circulate. With the bypass valve 77 open, a partially pressurized condition is maintained. Starting from this initial state, the cell enclosure 73 is firstly, evacuated through the riser needle 61 down to a pressure of 40 Pa by opening valve 69. After evacuation, valve 69 is closed and the enclosure is purged with argon from source 66 via valve 67. The evacuation and purge cycles are repeated and followed by a final evacuation.

All valves except bypass valve 77 are then closed. The filling operation proper then commences with the opening of overflow valves 71 and 72 followed by the opening of valves 62 and 63. Bypass valve 77 is closed to bring the pressure up to maximum and the cell fills via needle 60. When the cell is full, overflow valve 71 is closed and bypass valve 77 re-opened to reduce the pressure. At this stage, the riser needle 61 is partially withdrawn and the appropriate clamping screw 51 is tightened to compress the plug 38 across the riser perforation. The riser needle is then completely withdrawn and the cell 73 lowered on table 74 to partially withdraw it from the filler needle 60. The second clamping screw 51 is tightened to collapse the filler perforation. Valves 62 and 63 are closed to shut off the solution from the filler at which point, the module can be completely lowered away from the rig and removed. finally, excess solution can be blown out of the filler needle by briefly opening valve 67.

Assembly of the display cell can then be completed by bolting the heat sink and heater assembly 16 (FIG. 1) to the underside of body 15.

The entire filling operation has thus taken place without exposure of the solution to atmosphere, sealant contamination or heat. Because of the highly reactive nature of viologen this method of making the cell gives substantially increased yield and lifetime. However, it is, of course equally applicable to other types of liquid-filled display employing other electrochromic, electrophoretic or liquid crystal materials.

Thus, while the invention has been described with reference to preferred embodiments thereof, it will be understood by those skilled in the art that various changes in form and details may be made without departing from the scope of the invention.

Having thus described our invention, what we claim as new and desire to secure by Letters Patent is:

1. An electro-optic display cell having an arrangement of display electrodes in contact with a liquid within a sealed enclosure, the enclosure comprising:
impervious cover means comprising a transparent window, a rigid structural member forming part of the enclosure wall, a seal between the cover means and the structural member and an elastomeric plug extending between the exterior and interior of the enclosure, the plug having at least one filling perforation therethrough which is collapsed over at least a portion of its length so that the enclosure is completely sealed.

2. A display cell as claimed in claim 1 in which the structural member is a frame forming the side wall of the enclosure and through which the plug passes, the enclosure further comprising a base structure for supporting the display electrodes and a further seal between the base structure and the frame, the two seals being compression seals and the cell including clamping means for clamping the cover means, frame and base structure together.

3. A display cell as claimed in claim 2 in which the two seals and plug are an integral moulding of the elastomeric material around the frame member, the material also extending over at least the inner surfaces of the frame in contact with the liquid.

4. A display cell as claim in claim 3 in which the frame defines an apex for the enclosure at which apex the plug is located.

5. A display cell as claimed in claim 4 including plug clamping means for clamping the plug to ensure collapse of the at least one perforation.

6. A display cell as claimed in claim 5 in which the plug has two perforations therethrough and the plug clamping means comprises two screws mounted in the base structure each of which compresses the plug to ensure collapse of a respective perforation.

7. A display cell as claimed in claim 4 in which the frame has a cross bar of lower height than the frame portions forming the side wall, the cross bar defining a display electrode area and an expansion area, the elastomeric moulding extending across the expansion area to form a diaphragm which can flex to accommodate expansion or contraction of the liquid.

8. A display cell as claimed in claim 4 in which the base structure comprises a semiconductor chip on which the display electrodes are formed and a support body for the chip, the further moulded seal being arranged to seal the frame against the semiconductor chip to confine the liquid to the surface of the chip.

9. A method of making an electro-optic display cell of the kind having an arrangement of display electrodes in contact with a liquid within a sealed enclosure, comprising the steps of:
forming a pre-sealed enclosure from an impervious cover means comprising a transparent window, a rigid structural member forming part of the enclosure wall, a seal between the cover means and the structural member and an elastomeric plug extending between the exterior and interior of the enclosure;
filling the cell by perforating the plug with hollow needle means, removing entrapped gas from the enclosure and introducing said liquid into the enclosure by way of the needle means; and resealing the enclosure by effecting withdrawal of the needle means and collapsing or allowing to collapse the perforation or perforations formed by the needle means over at least a portion of their length.

10. A method as claimed in claim 9 in which the plug is mechanically clamped upon withdrawal of the needle means to ensure collapse of said perforation or perforations.

11. A method as claimed in claim 10 in which the needle means comprises a riser needle for removal of entrapped gas and a filler needle for introduction of said liquid, the riser needle being withdrawn after said liquid introducing step and prior to removal of the filler needle, the mechanical clamping step comprising, firstly, clamping the plug across the riser needle perforation after at least partial withdrawal of the riser needle and, secondly, clamping the plug across the filler needle perforation after withdrawal of the filler needle.

12. A method as claimed in claim 11 in which the clamping of the plug across the needle perforations takes place before the needles are fully withdrawn and while liquid under pressure is being supplied to the filler needle.

13. A method as claimed in any one of claims 9 to 12 which includes the steps of evacuating the enclosure via the needle means, purging the enclosure with an inert gas via the needle means, re-evacuating the enclosure via the needle means and, lastly, introducing said liquid into the enclosure via the needle means.

14. A method as claimed in any one of claims 9 to 12 in which the cell is oriented with the plug at the uppermost point of the enclosure during said filling steps.

15. A method as claimed in any one of claims 9 to 12 in which the seal is a compression seal and the step of forming the pre-sealed enclosure includes the step of mechanically clamping together the cover means, structural member and seal.

* * * * *